United States Patent
Chugtu et al.

(10) Patent No.: US 10,341,198 B2
(45) Date of Patent: Jul. 2, 2019

(54) CONFIGURING A BACK-END CONTAINER AND A CORRESPONDING FRONT-END PROXY CONTAINER ON A NETWORK DEVICE

(71) Applicant: Verizon Patent and Licensing Inc., Arlington, VA (US)

(72) Inventors: Manish Chugtu, Bedford, MA (US); Yuhang Zhao, Lexington, MA (US); Girish S. Welling, Nashua, NH (US); Lawrence Richard Rau, Dublin, NH (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 251 days.

(21) Appl. No.: 15/462,141

(22) Filed: Mar. 17, 2017

(65) Prior Publication Data
US 2018/0270124 A1    Sep. 20, 2018

(51) Int. Cl.
*H04L 12/24* (2006.01)
*H04L 29/08* (2006.01)
*H04L 29/12* (2006.01)
*G06F 8/60* (2018.01)
*G06F 9/50* (2006.01)

(52) U.S. Cl.
CPC .......... *H04L 41/5041* (2013.01); *G06F 8/60* (2013.01); *G06F 9/5083* (2013.01); *H04L 67/16* (2013.01); *H04L 67/28* (2013.01); *H04L 61/1511* (2013.01)

(58) Field of Classification Search
CPC .......... H04L 41/00; H04L 41/08–0806; H04L 41/0893; H04L 41/50; H04L 41/5041; H04L 67/00; H04L 67/10; H04L 67/16; H04L 67/28; H04L 63/00–0209; H04L 63/18; G06F 8/00; G06F 8/60; G06F 9/5083
See application file for complete search history.

(56) References Cited

U.S. PATENT DOCUMENTS

| | | | |
|---|---|---|---|
| 9,256,467 B1* | 2/2016 | Singh | G06F 9/5055 |
| 9,319,272 B1* | 4/2016 | Brandwine | H04L 41/0806 |
| 10,104,185 B1* | 10/2018 | Sharifi Mehr | H04L 67/16 |
| 2016/0342801 A1* | 11/2016 | Sreekanti | G06F 21/6209 |
| 2017/0093922 A1* | 3/2017 | Duan | H04L 63/1408 |
| 2017/0344584 A1* | 11/2017 | Parappalliyalil | H04L 67/1097 |
| 2018/0152534 A1* | 5/2018 | Kristiansson | H04L 67/16 |
| 2018/0176192 A1* | 6/2018 | Davis | H04L 9/3247 |
| 2018/0270202 A1* | 9/2018 | Li | H04L 63/0281 |
| 2018/0270203 A1* | 9/2018 | Zhao | H04L 63/0281 |

* cited by examiner

Primary Examiner — Tauqir Hussain
Assistant Examiner — Boris D Grijalva Lobos

(57) ABSTRACT

A device can receive a request to deploy a container to provide a service. The request can include information identifying a set of parameters associated with the container. The device can validate the request using the information identifying the set of parameters. The device can deploy the container on a back-end host. The back-end host can lack connectivity to an external network. The device can receive a first indication that the container was successfully deployed on the back-end host. The device can deploy a proxy container on a front-end host. The front-end host can have connectivity to the external network. The device can receive a second indication that the proxy container was successfully deployed on the front-end host. The device can provide a third indication. The third indication can indicate that the container was successfully deployed.

20 Claims, 5 Drawing Sheets

CONFIGURING A BACK-END CONTAINER AND A CORRESPONDING FRONT-END PROXY CONTAINER ON A NETWORK DEVICE

BACKGROUND

Operating-system-level virtualization can include a server virtualization method employed by a kernel of an operating system. Operating-system-level virtualization can permit multiple isolated user-space instances, rather than a single instance. Such instances can be referred to as "containers," "software containers," "virtualization engines," and/or the like. The instances can appear as real devices from the perspective of a user of another device, such as a client device.

DETAILED DESCRIPTION OF PREFERRED EMBODIMENTS

The following detailed description of example implementations refers to the accompanying drawings. The same reference numbers in different drawings can identify the same or similar elements.

An application can be deployed on a back-end host as a set of back-end containers. In some cases, the application can need external connectivity via a front-end host of the network device. However, deploying a container for the application on a front-end host can reduce security of the network device by providing a user of the application with both front-end and back-end access. In addition, managing back-end containers and corresponding front-end containers separately can be tedious and error-prone.

Implementations described herein enable a server device to deploy a container for an application on a back-end host and to deploy a proxy container (e.g., a proxy instance of a container) for the application on a front-end host of the network device. In addition, implementations can manage traffic destined for the container deployed on the back-end host via the proxy container deployed on the front-end host.

This provides an application deployed on a back-end host with external connectivity without deploying a container for the application on a front-end host, thereby increasing security of providing an application with external connectivity. In addition, this improves management of the application by permitting easy application of policies, load balancing of traffic, and/or the like among multiple back-end hosts, thereby increasing an efficiency and conserving processing resources.

Figure 1A:
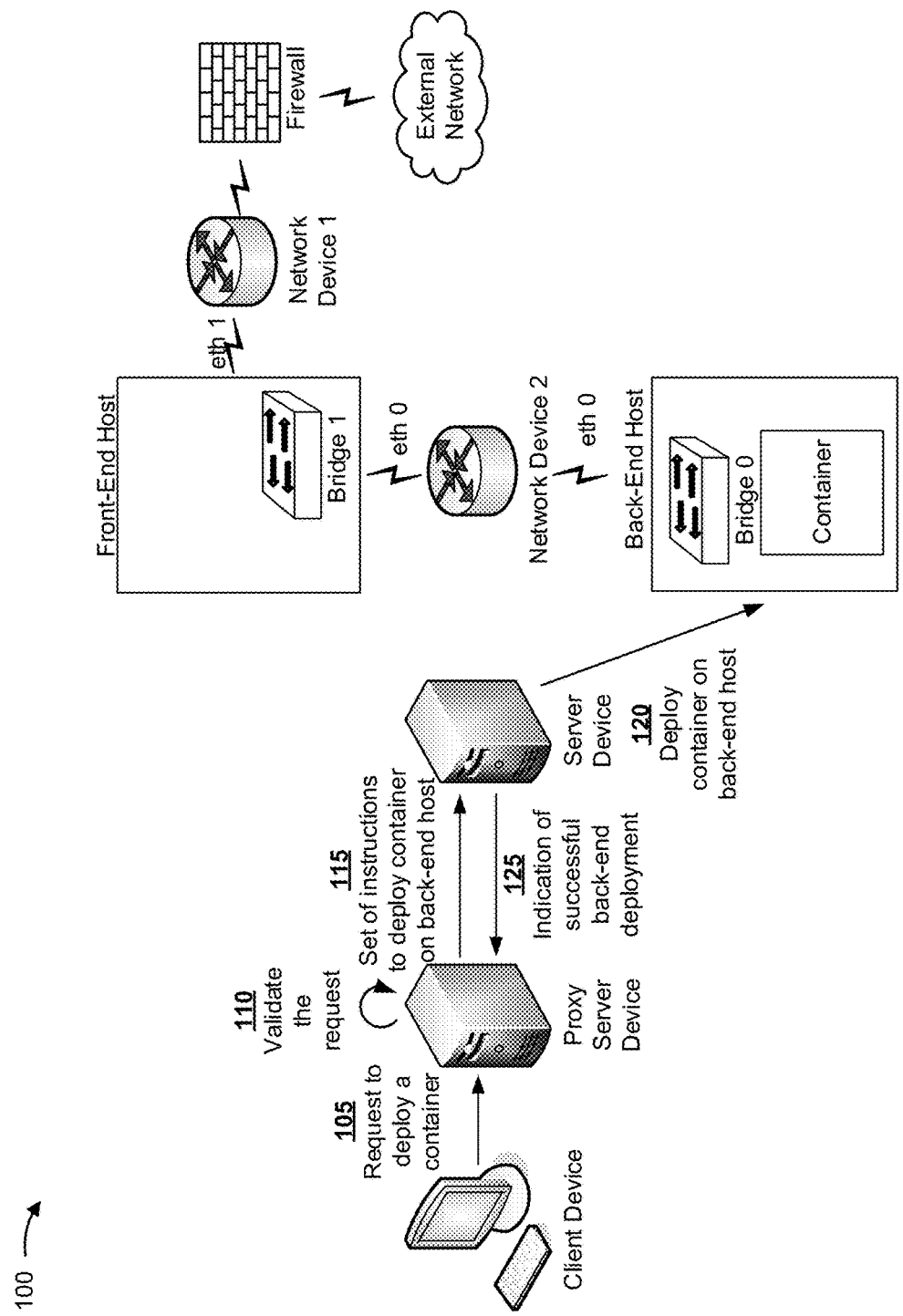
FIGS. 1A and 1B are diagrams of an overview of an example implementation described herein.
Figure 1B:
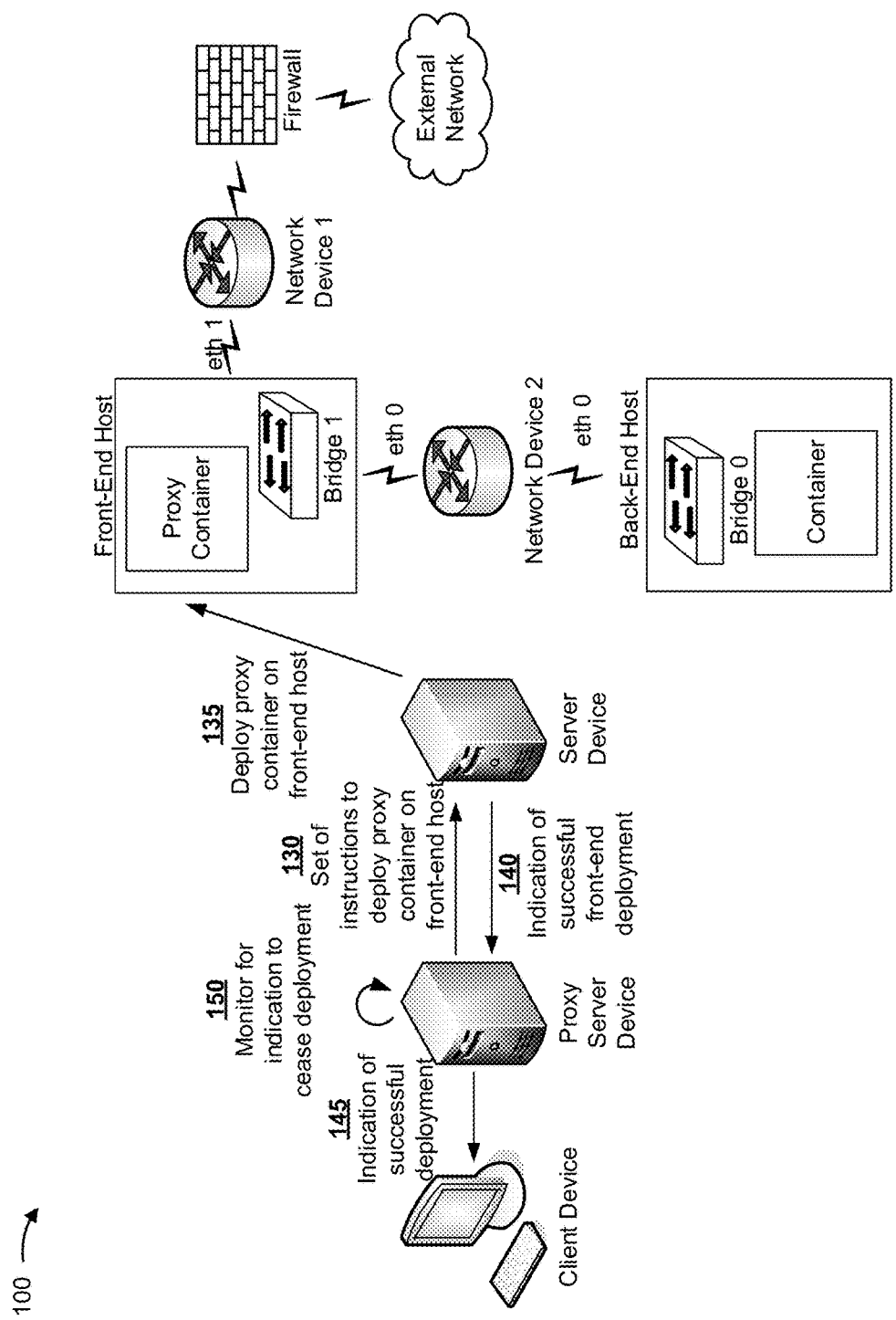

FIGS. 1A and 1B are diagrams of an overview of an example implementation 100 described herein. Example implementation 100 can include a front-end host, including bridge 1, that is connected to network device 1 (e.g., a switch), via an external Ethernet interface (e.g., eth 1). Network device 1 can provide the front-end host with connectivity to an external network via a firewall. The front-end host can be connected to a back-end host, including bridge 0, via an internal Ethernet interface (e.g., eth 0). The front-end host can be connected to the back-end host via network device 2 (e.g., a switch). As further shown in FIG. 1A, example implementation 100 can include a client device, a server device, and a proxy server device located between the client device and the server device. The server device can be connected to one or more front-end hosts and/or back-end hosts.

As shown in FIG. 1A, and by reference number 105, a proxy server device can receive a request from a client device to deploy a container. The request can include information identifying a set of parameters for the container to be deployed. For example, the set of parameters can include an application type (e.g., web-based or non-web-based) associated with the container, an amount of processing resources (e.g., a quantity of central processing units (CPUs)) requested for the container, an amount of memory resources requested for the container, a quantity of instances of the container requested, and/or the like.

As shown by reference number 110, the proxy server device can validate the request based on the set of parameters. For example, the proxy server device can determine whether the user of the client device has permission to deploy the container (e.g., based on in information included in the request that identifies the user making the request), whether the application type is permitted and/or available for the user, whether the amount of processing resources is permitted and/or available for the user, the application, or the application type, whether the amount of memory resources is permitted and/or available for the user, the application, or the application type, whether the quantity of instances of the container is permitted and/or available for the user, the application, or the application type, and/or the like. As shown by reference number 115, the proxy server device can provide a set of instructions to the server device to deploy a container on a back-end host. For example, the set of instructions can cause the server device to deploy a container according to the set of parameters.

As shown by reference number 120, the server device can deploy the container on the back-end host. For example, the server device can deploy the container based on the set of parameters. As shown by reference number 125, the proxy server device can receive an indication from the server device that the container was successfully deployed on the back-end host. For example, the server device can provide the indication after deploying the container on the back-end host.

In this way, the proxy server device can cause a requested container for an application to be deployed on a back-end host.

As shown in FIG. 1B, and by reference number 130, the proxy server device can provide a set of instructions to the server device to deploy a proxy container on the front-end host. For example, the proxy container can be associated with the container deployed on the back-end host and can be a proxy instance of the container. As shown by reference number 135, the server device can deploy the proxy container on the front-end host. The front-end host can be associated with the same, or a different, network device as the back-end host.

As shown by reference number 140, the proxy server device can receive an indication from the server device that the proxy container was successfully deployed on the front-end host. As shown by reference number 145, the proxy server device can provide an indication to the client device (e.g., for display), that the requested container was successfully deployed. As shown by reference number 150, the proxy server device can monitor for an indication from the client device, to cease deployment of the container deployed on behalf of the client device. The proxy server device can cause deployment of the container and/or the proxy container to cease when the proxy server device receives an indication to cease deployment (e.g., from the client device).

In this way, a proxy server device can deploy a proxy container on a front-end host for a container deployed on a back-end host. This permits the container on the back-end host to have external connectivity. In addition, the proxy container can include firewall rules, load balancing rules, and/or the like defined by a network administrator. This permits the proxy container to manage traffic destined for the container, thereby increasing security of a private network, the container, the back-end host, and/or other devices, such as the server device or the proxy server device.

As indicated above, FIGS. 1A and 1B are provided merely as an example. Other examples are possible and can differ from what was described with regard to FIGS. 1A and 1B.

Figure 2:
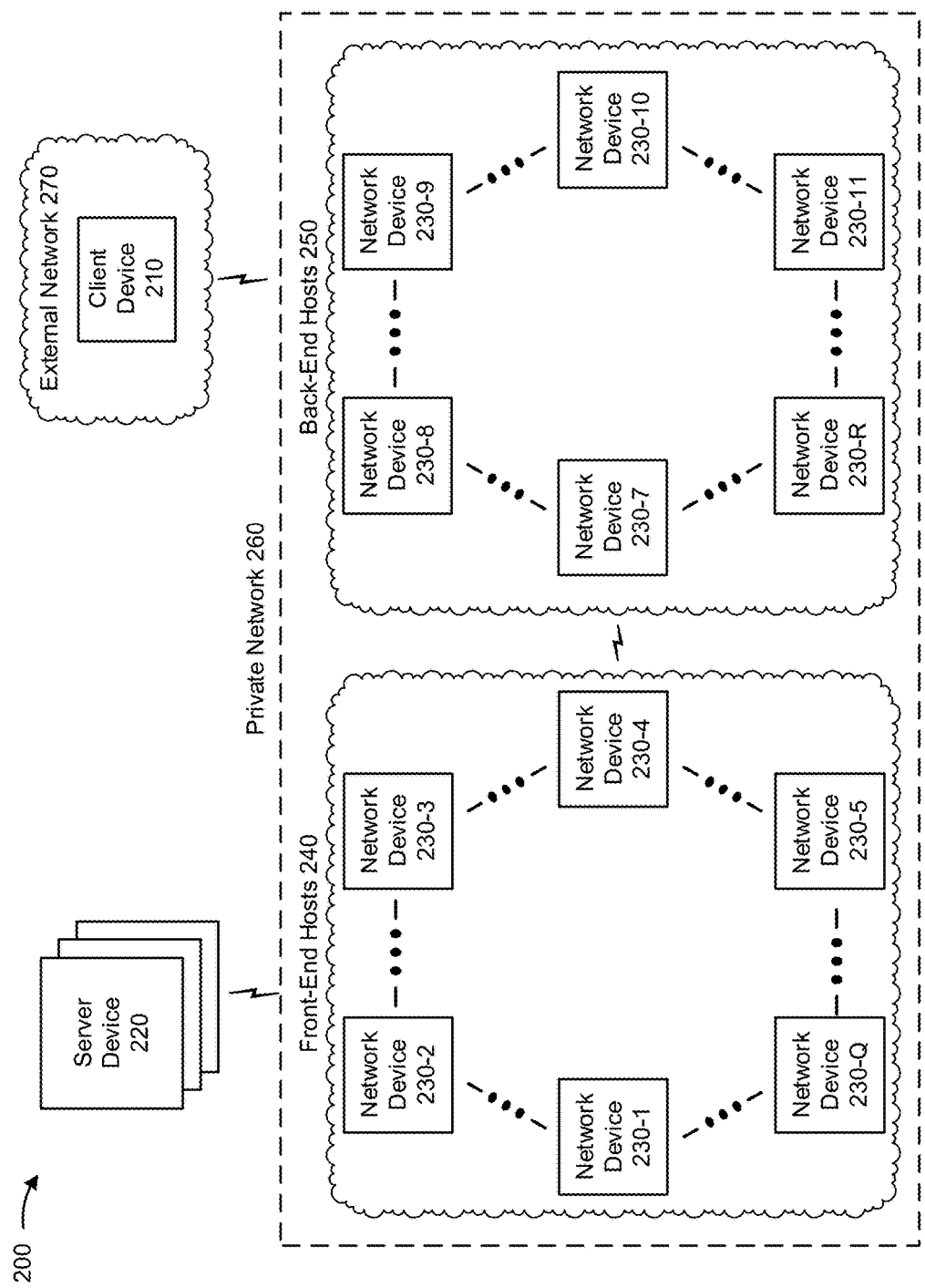
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include client device 210, a set of server devices 220 (referred to collectively as "server devices 220" and individually as "server device 220"), one or more network devices 230 (shown as network device 230-1 through network device 230-Q and network device 230-7 through network device 230-R), front-end hosts 240, back-end hosts 250, private network 260, and external network 270. Devices of environment 200 can interconnect via wired connections, wireless connections, or a combination of wired and wireless connections.

Client device 210 includes one or more devices capable of receiving, generating, storing, processing, and/or providing information associated with a container to be deployed for an application. For example, client device 210 can include a communication and/or computing device, such as a desktop computer, a mobile phone (e.g., a smart phone or a radiotelephone), a laptop computer, a tablet computer, a gaming device, a wearable communication device (e.g., a smart wristwatch or a pair of smart eyeglasses), or a similar type of device. In some implementations, client device 210 can provide a request for a container to server device 220, as described elsewhere herein. Additionally, or alternatively, client device 210 can receive an indication that the container was successfully deployed, as described elsewhere herein.

Server device 220 includes one or more devices capable of receiving, storing, generating, providing, and/or processing information associated with a container to be deployed for an application. In some implementations, server device 220 can include a server (e.g., in a data center or a cloud computing environment), a proxy server, a data center (e.g., a multi-server micro data center), a workstation computer, a virtual machine (VM) provided in a cloud computing environment, a user device, or a similar type of device. In some implementations, server device 220 can receive a request for a container to be deployed, as described elsewhere herein. Additionally, or alternatively, server device 220 can cause a requested container to be deployed on a back-end host and/or a proxy container for the requested container to be deployed on a front-end host, as described elsewhere herein.

Network device 230 includes one or more devices (e.g., one or more traffic transfer devices) capable of receiving, storing, generating, processing, and/or providing information associated with a container to be deployed for an application. For example, network device 230 can include a firewall, a router, a gateway, a switch, a hub, a bridge, a reverse proxy, a server (e.g., a proxy server), a security device, an intrusion detection device, a load balancer, or a similar type of device. In some implementations, network device 230 can include, or function as, a front-end host and/or a back-end host (e.g., that host a container and/or a proxy container), as described elsewhere herein. Additionally, or alternatively, network device 230 can host a container, or a proxy container for the container (e.g., on a front-end host or back-end host or network device 230), as described elsewhere herein.

Front-end hosts 240 includes a cluster of computing resources (e.g., network devices 230) associated with receiving, generating, storing, processing, and/or providing information associated with an application. For example, front-end hosts 240 can include a set of network devices 230 that can be addressable by client device 210 from external network 270. In some implementations, front-end hosts 240 can be a cluster of devices with an orchestration framework to control the cluster of devices. In some implementations, the orchestration framework can include one or more containers (e.g., platform containers). In some implementations, front-end hosts 240 can include a set of network devices 230 configured to provide access to an application via a proxy container. In some implementations, front-end hosts 240 can include a set of network devices 230 configured to provide routing, switching, processing, and/or the like of data that is to be directed to/from a container hosted via private network 260. In some implementations, network devices 230 can operate a container (e.g., a platform container) that provide a particular functionality for front-end hosts 240, such as a network service discovery manager, a networking script, such as Pipework; a dynamic firewall, a routing program, such as Quagga, and/or the like. In some implementations, network devices 230 can host containers, such as Docker containers, and/or the like.

Back-end hosts 250 includes a cluster of computing resources (e.g., network devices 230) associated with receiving, generating, storing, processing, and/or providing information associated with an application. For example, back-end hosts 250 can include a set of network devices 230 that communicate with network devices 230 of front-end hosts 240, and can communicate with client device 210 via front-end hosts 240. In other words, back-end hosts 250 might not be directly addressable by client devices 210. In some implementations, back-end hosts 250 includes applications, operating as containers on network devices 230, to provide software-as-a-service. In some implementations, back-end hosts 250 can include a first set of network devices 230 configured to provide access to an application via a container and a second set of network devices 230 configured to provide routing, switching, processing, and/or the like of data that is to be directed to/from a container hosted via private network 260.

Private network 260 includes an environment that includes front-end hosts 240 and back-end hosts 250. Private network 260 can be a cloud network that provides computation, software, data access, storage, etc. services that do not require end-user (e.g., client device 210) knowledge of a physical location and configuration of system(s) and/or device(s) that front-end hosts 240 and/or back-end hosts 250 host. Additionally, or alternatively, private network 260 can be a non-cloud based network of computing resources, such as a network associated with a data center.

External network 270 includes one or more wired and/or wireless networks. For example, external network 270 can include a cellular network (e.g., a long-term evolution (LTE) network, a code division multiple access (CDMA) network, a 3G network, a 4G network, a 5G network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
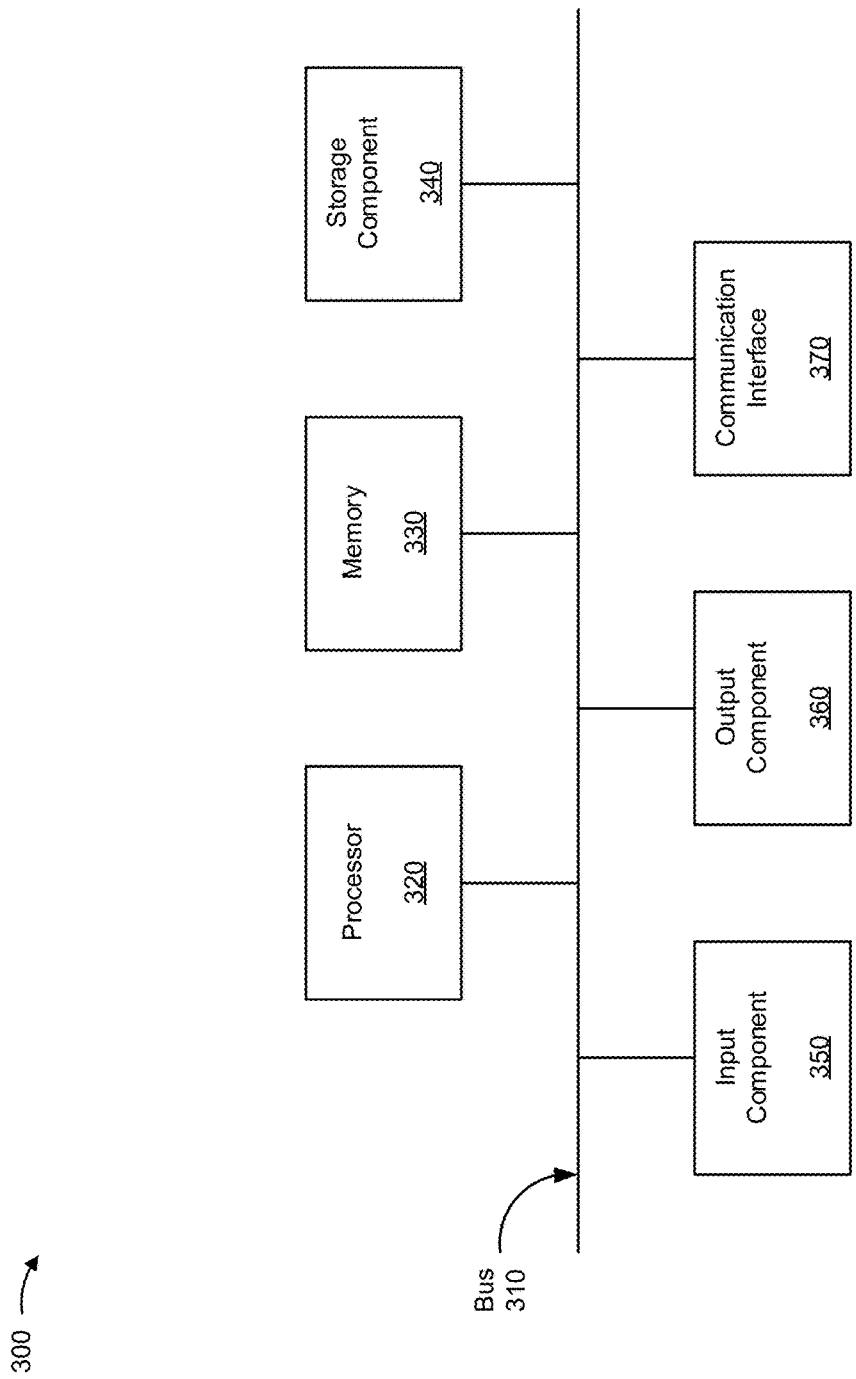
FIG. 3 is a diagram of example components of one or more devices of FIG. 2.

FIG. 3 is a diagram of example components of a device 300. Device 300 can correspond to client device 210, server device 220, and/or network device 230. In some implementations, client device 210, server device 220, and/or network device 230 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
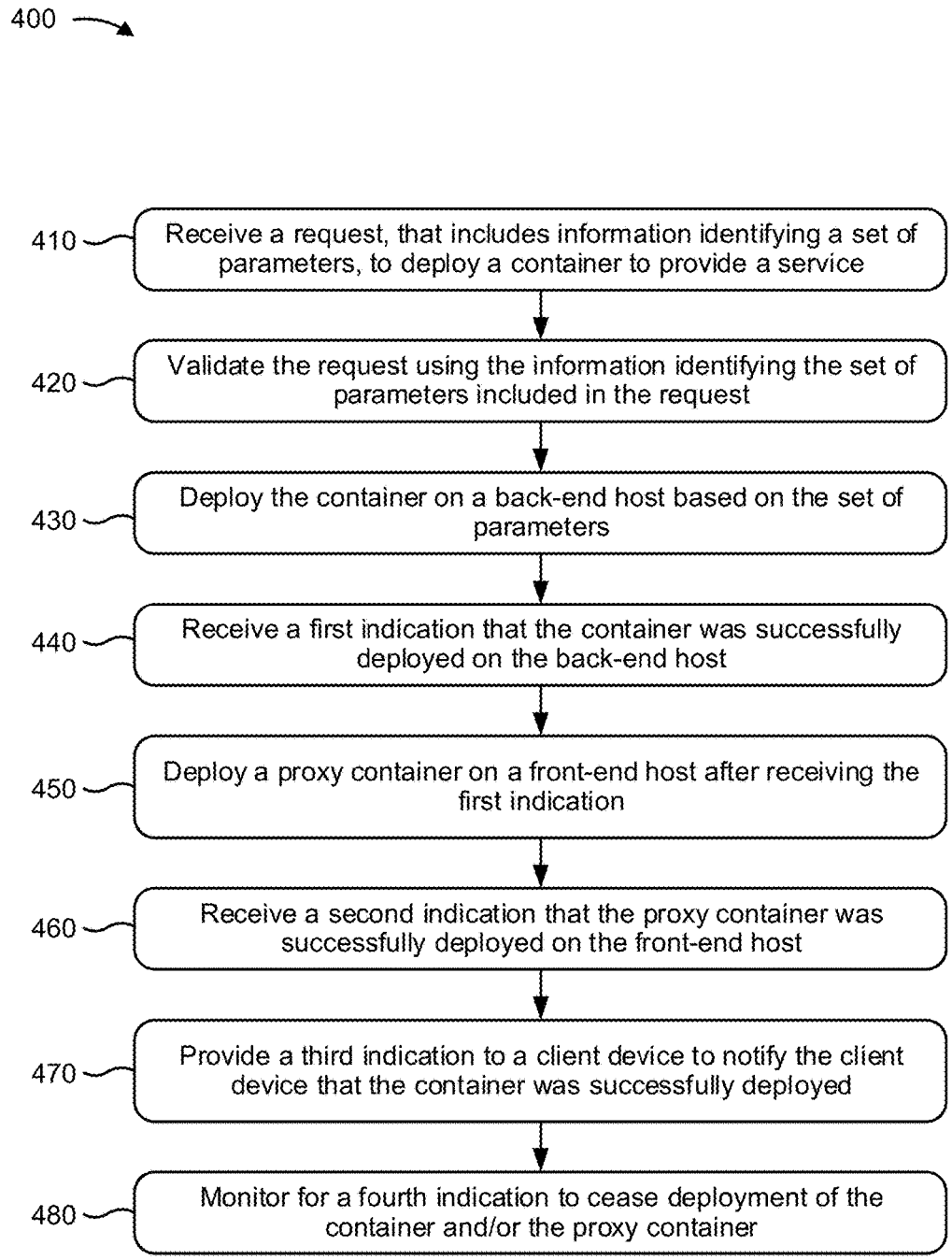
FIG. 4 is a flow chart of an example process for configuring a back-end container and a corresponding front-end proxy container on a network device.

FIG. 4 is a flow chart of an example process 400 for configuring a back-end container and a corresponding front-end proxy container on one or more network devices. In some implementations, one or more process blocks of FIG. 4 can be performed by server device 220. In some implementations, one or more process blocks of FIG. 4 can be performed by another device or a group of devices separate from or including server device 220, such as client device 210 and network device 230.

As shown in FIG. 4, process 400 can include receiving a request, that includes information identifying a set of parameters, to deploy a container to provide a service (block 410). For example, server device 220 can receive the request. In some implementations, server device 220 can receive the request from client device 210, based on user input to client device 210, periodically, according to a schedule, and/or the like.

In some implementations, server device 220 can include a proxy server device 220 or another server device 220. For example, server device 220 can include a proxy server device 220 located between client device 210 and another server device 220 (e.g., a non-proxy server device 220). In some implementations, multiple server devices 220 can be used to deploy multiple containers or proxy containers. In some implementations, each of the multiple proxy containers can have functionality related to each container or proxy container deployed (e.g., where each container or proxy container is associated with a different service of an application). In some implementations, the container can include a self-contained execution environment. In this case, each of the multiple server devices 220 can be independently deployed, upgraded, downgraded, and/or the like. This increases scalability and permits easy reconfiguration when additional containers or proxy containers (e.g., providing additional services) are needed.

In some implementations, the set of parameters can include information associated with the container to be deployed. For example, the set of parameters can include information identifying a type of application being deployed (e.g., a web-based application, a non-web-based application, etc.); an amount of processing resources needed to deploy the container, a quantity of instances of the application and/or the container to be deployed, an amount of memory resources needed to deploy the container, and/or the like. This permits customization of a request for a container. In some implementations, the container can be associated with an application.

In some implementations, a container can include a user space virtual instance that can be used to provide a service (e.g., a micro-service, such as a data input service, a data processing service, or a data output service). For example, the container can be used to provide a service associated with an application. In some implementations, an application can include a set of services (e.g., provided via a set of containers). For example, an application can use a first container to provide a first service, a second container to provide a second service, and so forth. In some implementations, a container can include one or more processes (e.g., Linux processes) that share organizational and operational configurations (e.g., namespace abstractions of system resources and access controls).

In some implementations, the request can be destined for a device other than server device 220 (e.g., a different server device 220). For example, when server device 220 is a proxy server device 220, the request can be destined for a non-proxy server device 220. In this way, server device 220 can provide a proxy service to client device 210.

In some implementations, server device 220 can receive a single request for a single container. In some implementations, server device 220 can receive a single request for multiple instances of the same container (e.g., associated with the same application). In some implementations, server device 220 can receive multiple requests for multiple different containers (e.g., associated with the same application). In some implementations, server device 220 can receive multiple requests for multiple containers associated with different applications. In this way, server device 220 can receive requests for various different types of container deployments.

In some implementations, the request can include information indicating whether the container is to be deployed on front-end hosts 240 or back-end hosts 250. For example, the request can specify that the container is to be deployed on front-end hosts 240 or back-end hosts 250. In some implementations, the request can lack information indicating whether the container is to be deployed on front-end hosts 240 and/or back-end hosts 250. For example, the request can include a request for a container without including information specifying whether the container is to be deployed on front-end hosts 240 or back-end hosts 250.

In some implementations, when the request lacks information indicating whether the container is to be deployed on front-end hosts 240 and/or back-end hosts 250, server device 220 can determine the type of deployment for the container, as described below. For example, server device 220 can determine whether the container (and/or a proxy container for the container) is to be deployed on front-end hosts 240 and/or back-end hosts 250. In this way, server device 220 can receive a request that lacks information indicating whether a requested deployment is for front-end hosts 240 or back-end hosts 250.

In some implementations, server device 220 can determine the type of deployment based on information included in the request. For example, server device 220 can determine the type of deployment for the container based on the type of application associated with the container to be deployed (e.g., as indicated by the request). Continuing with the previous example, server device 220 can determine to deploy both front-end and back-end containers (or a container and a corresponding proxy container) based on a request for a container indicating that the container is associated with a web-based application. As another example, server device 220 can determine to deploy a back-end container and not a front-end container, or a front-end container and not a back-end container, for a container associated with a non-web application. In this way, server device 220 can determine a type of deployment for a requested container based on information included in a request for the container.

Additionally, or alternatively, server device 220 can determine a type of deployment for a container to be deployed based on other parameters identified by information included in the request. For example, server device 220 can determine to deploy multiple instances of the same container on one or more front and/or back-end hosts 250 based on the request including a request for a threshold amount of memory. In this way, server device 220 can determine a type of deployment for a container based on other parameters identified by information included in a request for the container.

In this way, server device 220 can receive a request to deploy a container to provide a service.

As further shown in FIG. 4, process 400 can include validating the request using the information identifying the set of parameters included in the request (block 420). For example, server device 220 can validate the request. In some implementations, server device 220 can validate the request using the set of parameters included in the request, other information associated with the request, and/or information that server device 220 has stored.

In some implementations, server device 220 can validate the request based on information identifying a port number. For example, server device 220 can validate the request based on information identifying the port number via which the container, or an application associated with the container, is to receive traffic (e.g., to prevent the container from receiving traffic that the container does not have permission to receive). In this way, server device 220 can validate a request for a container based on information identifying a port to be used by the container.

Additionally, or alternatively, server device 220 can validate the request based on information identifying the type of container being requested. For example, server device 220 can validate the request based on whether a user of client device 210 has permission to deploy the type of container being requested (e.g., based on a user identifier included in the request that identifies a user of client device 210). In this way, server device 220 can validate a request for a container based on information identifying the type of container requested.

Additionally, or alternatively, server device 220 can validate the request based on a credential (e.g., a username/password combination, a security token, etc.) received in association with the request. For example, the credential can be input by a user of client device 210 and client device 210 can provide the credential to server device 220 when providing the request to server device 220. In this way, server device 220 can validate a request based on a credential received in association with a request.

Additionally, or alternatively, server device 220 can validate the request based on information identifying a set of approved applications. For example, the request can include an application identifier identifying an application with which the container to be deployed is associated. Continuing with the previous example, in some implementations, server device 220 can compare the application identifier included in the request and a set of application identifiers and can validate the request when the comparison indicates a match. In this way, server device 220 can validate a request for a container based on information identifying an application with which the container is associated.

Additionally, or alternatively, server device 220 can validate the request based on an identifier associated with the container requested to be deployed (e.g., a container identifier). For example, the request can include a container image identifier. Continuing with the previous example, in some implementations, server device 220 can compare the container image identifier included in the request and a set of container image identifiers and can validate the request when the comparison indicates a match. In this way, server device 220 can validate a request based on an identifier associated with a requested container.

In some implementations, server device 220 can validate that there are sufficient resources (e.g., processing and/or memory) to deploy the container. For example, server device 220 can validate the amount of resources available for deployment of the container (e.g., using information that identifies the amount of resources available). In some implementations, server device 220 can cause the container to be deployed when server device 220 validates that there are sufficient resources for the deployment. For example, server device 220 can deploy the container when the amount of resources available satisfies a threshold. This conserves resources and/or improves operations relative to deploying, or attempting to deploy, a container with fewer than the needed resources.

In some implementations, server device 220 can prevent deployment of the container when server device 220 fails to validate the request. Additionally, or alternatively, server device 220 can provide information for display indicating that server device 220 failed to validate the request. This increases security by preventing a container from being deployed when server device 220 fails to validate a request to deploy the container.

In this way, server device 220 can validate a request to deploy a container using information included in the request.

As further shown in FIG. 4, process 400 can include deploying the container on a back-end host based on the set of parameters (block 430). For example, server device 220 can deploy the container on back-end hosts 250. In some implementations, server device 220 can deploy the container using the set of parameters. For example, server device 220 can deploy a container with the requested amount of processing resources, the requested amount of memory resources, the requested quantity of instances of the container, and/or the like.

In some implementations, server device 220 can deploy a single container. For example, server device 220 can deploy a single container on a single back-end host. In some implementations, server device 220 can deploy multiple containers. For example, in some implementations, server device 220 can deploy multiple containers (or multiple instances of the same container) on back-end hosts 250. In some implementations, for example, server device 220 can deploy multiple containers (or multiple instances of the same container) on multiple back-end hosts 250. In this way, server device 220 can implement various deployments of containers.

In some implementations, a device other than server device 220 can deploy the container. For example, when server device 220 is a proxy server, a non-proxy server device 220 can deploy the container. In some implementations, when a device other than server device 220 is to deploy the container, server device 220 can cause the other device to deploy the container. For example, server device 220 can send a set of instructions to the other device to cause the other device to deploy the container. This conserves processing resources of server device 220 by reducing or eliminating a need for server device 220 to deploy the container.

In some implementations, server device 220 can deploy the container based on the type of deployment determined by server device 220, based on information included in the request, and/or the like. For example, server device 220 can deploy the container on back-end hosts 250 based on determining that the container is to be deployed on back-end hosts 250, based on the request including information that identifies that the container is to be deployed on back-end hosts 250, and/or the like. In some implementations, when a device other than server device 220 is to deploy the container, the set of instructions can identify the type of deployment for the container. For example, server device 220 can provide a set of instructions to another device that identifies that the container is to be deployed on back-end hosts 250.

In this way, server device 220 can deploy a container on back-end hosts 250 based on a set of parameters.

As further shown in FIG. 4, process 400 can include receiving a first indication that the container was successfully deployed on the back-end host (block 440). For example, server device 220 can receive a first indication that the container was successfully deployed on back-end hosts 250. In some implementations, server device 220 can receive the first indication after deploying the container, or causing the container to be deployed.

In some implementations, server device 220 can receive the first indication from network device 230. For example, server device 220 can receive the first indication from network device 230 that is functioning as back-end hosts 250 (e.g., where the container is deployed). Additionally, or alternatively, server device 220 can receive the first indication from another server device 220. For example, when server device 220 is a proxy server device 220, server device 220 can receive the first indication from another non-proxy server device 220 (e.g., between the proxy server device 220 and network device 230) that has deployed the container on back-end hosts 250.

Additionally, or alternatively, server device 220 can receive the first indication in another manner. In some implementations, server device 220 can perform a test of the container to determine whether the container was successfully deployed. Additionally, or alternatively, server device 220 can send a message to network device 230 to request information regarding the deployment of the container.

In some implementations, the first indication can indicate that the deployment of the container was unsuccessful (e.g., when server device 220 fails to deploy the container). In some implementations, when the first indication indicates that the deployment was unsuccessful, server device 220 can attempt to re-deploy the container, provide an indication to client device 210 that the deployment was unsuccessful, record information indicating that the deployment was unsuccessful, and/or the like.

In this way, server device 220 can receive a first indication that a container was successfully deployed on back-end hosts 250.

As further shown in FIG. 4, process 400 can include deploying a proxy container on a front-end host after receiving the first indication (block 450). For example, server device 220 can deploy a proxy container. In some implementations, server device 220 can deploy the proxy container on front-end hosts 240 after receiving the first indication (e.g., of successful deployment of a container on back-end hosts 250).

In some implementations, server device 220 can deploy the proxy container in a manner similar to that described above with respect to block 430. For example, server device 220 can deploy the proxy container, server device 220 can provide a set of instructions to another device to cause the other device to deploy the proxy container, and/or the like.

In some implementations, server device 220 can generate a set of instructions for the front-end deployment based on the originally received request when deploying the proxy container. For example, when server device 220 is a proxy server device 220, server device 220 can generate a set of instructions to deploy a front-end proxy container with the requested amount of processing resources, the requested amount of memory resources, and/or the like.

In some implementations, a proxy container can include a container that has external connectivity (e.g., to external network 270) and connectivity to another container (e.g., a non-proxy container deployed on back-end hosts 250). Additionally, or alternatively, the proxy container can include a container with reverse hypertext transfer protocol (HTTP) proxy functionality. In some implementations, the proxy container can be connected to one or more network devices 230. Additionally, or alternatively, the proxy container can be controlled by a network administrator.

In this way, server device 220 can provide a user of client device 210 with external connectivity, via the proxy container, without deploying the requested container on the front-end. In addition, this increases security of front-end hosts 240, back-end hosts 250, and/or private network 260 via network administrator control of the proxy container deployed on front-end hosts 240. For example, this increases security because a network administrator can use the proxy container to intercept traffic destined for containers deployed on back-end hosts 250 and can implement policies, load balancing, etc. for the traffic via the proxy container.

In some implementations, server device 220 can store information to facilitate front-end and back-end communication. For example, server device 220 can store information identifying back-end containers and corresponding front-end containers (e.g., in a data structure distributed across multiple devices). In this way, when the proxy container receives traffic from external network 270, the proxy container can identify a corresponding container deployed on back-end hosts 250 to which to provide the traffic, identify multiple instances of a container deployed on one or more back-end hosts 250 across which to load balance the traffic, and/or the like. In this way, server device 220 can manage a front-end and back-end connection.

In this way, server device 220 can deploy a proxy container on front-end hosts 240 after receiving the first indication.

As further shown in FIG. 4, process 400 can include receiving a second indication that the proxy container was successfully deployed on the front-end host (block 460). For example, server device 220 can receive a second indication that the proxy container was successfully deployed on front-end hosts 240. In some implementations, server device 220 can receive the second indication after deploying the proxy container on front-end hosts 240. In some implementations, server device 220 can receive the second indication in a manner similar to that described above with respect to block 440.

In some implementations, server device 220 can configure interfaces for directing network traffic between the proxy container and a device of external network 270. In some implementations, server device 220 can configure connectivity between a first interface and a second interface. For example, the proxy container can include a first interface for routing traffic between the container and back-end hosts 250, and server device 220 can configure a second interface for routing traffic between the proxy container and external network 270. In this case, server device 220 can connect the first interface and the second interface to permit the proxy container to proxy data between external network 270 and one or more applications or containers operating on back-end hosts 250. In some implementations, the first interface can be associated with a network address in a cluster address range of private network 260 (e.g., a private address range) and the second interface can be associated with a network address in a public address range. In some implementations, server device 220 can use representational state transfer (RESTful) application programming interfaces (APIs) to configure the interfaces of the proxy container.

In some implementations, the second indication can indicate that the deployment of the proxy container was unsuccessful (e.g., when server device 220 fails to deploy the proxy container). In some implementations, when the second indication indicates that the deployment was unsuccessful, server device 220 can attempt to re-deploy the proxy container, provide an indication to client device 210 that the deployment was unsuccessful, record information indicating that the deployment was unsuccessful, and/or the like.

In this way, server device 220 can receive a second indication that a proxy container was successfully deployed on front-end hosts 240.

As further shown in FIG. 4, process 400 can include providing a third indication to a client device to notify the client device that the container was successfully deployed (block 470). For example, server device 220 can provide a third indication to client device 210 (e.g., for display). In some implementations, server device 220 can provide the third indication to notify client device 210 that the requested container was successfully deployed.

In some implementations, server device 220 can provide the third indication after deploying the container and the proxy container, based on receiving a request to provide the third indication, based on user input, and/or the like. In some implementations, the third indication can lack information identifying the type of deployment of the container. For example, the third indication can lack information indicating whether the container was deployed on back-end hosts 250 or front-end hosts 240. Continuing with the previous example, assume that the request included a request for a container with access to external network 270 and that server device 220 deployed the container on back-end hosts 250 (e.g., that lacks access to external network 270) and a corresponding proxy container on front-end hosts 240 to provide the container with access to external network 270. In this case, the third indication can lack information indicating that the requested container was deployed on back-end hosts 250, despite the request including a request for a container with access to external network 270. This permits server device 220 to seamlessly deploy a back-end container and a corresponding front-end proxy container.

In some implementations, the third indication can include a message (e.g., that includes information regarding deployment of the container). For example, the message can include an email, a short message service (SMS) message, a multimedia messaging service (MMS) message, and/or the like.

In some implementations, server device 220 can perform an action related to the third indication other than providing the third indication to client device 210. In some implementations, server device 220 can store a copy of the third indication (e.g., to generate a record of containers and/or proxy containers that have been deployed). Additionally, or alternatively, server device 220 can provide the third indication to another client device 210 (e.g., associated with a network administrator). Additionally, or alternatively, server device 220 can record metrics associated with deployment of the container and/or the proxy container. For example, server device 220 can record metrics related to the amount of processing resources requested, an amount of memory resources requested, an amount of time requested for the deployment of the container, and/or the like.

In some implementations, server device 220 can aggregate information identifying the metrics with information from other deployments, so as to permit analysis of the information. In some implementations, server device 220 can generate a report that includes information identifying the metrics. Additionally, or alternatively, server device 220 can generate a prediction related to resources needed for another deployment of a container or a proxy container (e.g., based on aggregated historical metrics). This permits server device 220 to provide information and/or generate a recommendation regarding computing, processing, and/or memory resources, such as the manner in which the resources are being used, an amount of resources that can be needed in the future, and/or the like. In this way, server device 220 can perform an action other than providing the third indication.

In this way, server device 220 can provide a third indication to client device 210 to notify client device 210 that a container was successfully deployed.

As further shown in FIG. 4, process 400 can include monitoring for a fourth indication to cease deployment of the container and/or the proxy container (block 480). For example, server device 220 can monitor for a fourth indication to cease deployment of the container and/or the proxy container. In some implementations, server device 220 can monitor for the fourth indication after providing the third indication to client device 210 and/or deploying the container/proxy container. In some implementations, server device 220 can receive the fourth indication when a threshold amount of time for deploying the container has elapsed, when a threshold amount of traffic has been received by the container and/or the proxy container, based on user input from a user of client device 210, and/or the like.

In some implementations, server device 220 can perform an action other than monitoring for the fourth indication. In some implementations, server device 220 can perform an orchestration service. For example, server device 220 can manage communications between the proxy container and the container, can handle exceptions during communications between the proxy container and the container, and/or the like. Additionally, or alternatively, server device 220 can perform load balancing, or provide a set of instructions related to load balancing to another device. For example, server device 220 can load balance traffic across multiple front-end hosts 240, multiple back-end hosts 250, multiple containers/proxy containers deployed on the same host or different hosts, and/or the like.

Additionally, or alternatively, server device 220 can implement a policy or rule related to traffic received by the proxy container, or provide a set of instructions regarding the rule/policy. For example, server device 220 can monitor traffic from external network 270 received by the proxy container and can provide a set of instructions to the proxy container to cause the proxy container to drop the traffic, permit the traffic to be sent to a container deployed on back-end hosts 250, and/or the like.

Additionally, or alternatively, server device 220 can communicate with a container, a proxy container, another server device 220, and/or network device 230, such as by using an application program interface (API). For example, server device 220 can communicate with a domain name system (DNS) server to dynamically configure DNS records for transparent outbound transmission control protocol (TCP) proxy. Continuing with the previous example, server device 220 can configure a DNS record to permit transparent outbound TCP proxy, and can deploy a container after configuring the DNS record. In some implementations, transparent outbound TCP proxy can include Internet protocol (IP)-level (e.g., open system interconnection (OSI) layer 3) interception and spoofing of outbound traffic, such as to hide a proxy IP address from other devices.

In some implementations, server device 220 can end a front-end and/or back-end deployment upon receiving the fourth indication. For example, server device 220 can receive a fourth indication to end deployment of a requested container and can end a back-end deployment of a container. Continuing with the previous example, server device 220 can automatically end a corresponding front-end deployment of a proxy container when server device 220 receives an indication to end deployment of a corresponding back-end container. In some implementations, server device 220 can end deployment of a container and/or a proxy container by providing a set of instructions to network device 230 (e.g., functioning as the front-end and/or back-end hosts 250), another server device 220 (e.g., a non-proxy server device 220 when server device 220 is a proxy server device 220), and/or the like. In this way, server device 220 can perform an action other than monitoring for a fourth indication to cease deployment of a container and/or a proxy container.

In this way, server device 220 can monitor for a fourth indication to cease deployment of a container and/or a proxy container.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Implementations described herein permit a server device to deploy a requested container on a back-end host and a corresponding proxy container on a front-end host. This enables the server device to provide a requested container with external connectivity without deploying the container on the front-end host. This increases security of a network by reducing or eliminating the need to deploy a container on a front-end host, as the proxy container can be managed by a network administrator. In addition, this improves management of a deployed container via easier application of rules/policies and/or load balancing of traffic, thereby increasing efficiency and conserving processing resources.

Although implementations are described with respect to a container, the implementations can apply to any virtualization or separation of platform method (e.g., any server virtualization method, such as any operating-system-level virtualization method). For example, the implementations can apply to Solaris zones, FreeBSD jails, virtual machines (e.g., associated with an operating system and/or hypervisor), and/or the like. In addition, although implementations are described with respect to a container, the implementations can apply to any other architecture. For example, front-end orchestration methods described herein can apply to a proxy implemented by a virtual machine or a native host process.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more hardware processors to:
  receive, from a client device, a request to deploy a container to provide service,
    the request including information identifying a set of parameters associated with the container,
    the container including a self-contained execution environment,
  validate the request using the information identifying the set of parameters based on receiving the request;
  deploy the container on a back-end host based on validating the request,
    the back-end host lacking connectivity to au external network;
  receive a first indication that the container was successfully deployed on the back-end host after deploying the container;
  deploy a proxy container on a front-end host based on receiving the first indication,
    the front-end host having connectivity to the external network;
  receive a second indication that the proxy container was successfully deployed on the front-end host after deploying the proxy container; and
  provide a third indication to the client device based on receiving the second indication,
    the third indication indicating that the container was successfully deployed.

2. The device of claim 1, w here the one or more processors are further to:
monitor for a fourth indication ease deployment of the container or the proxy container after deploying the proxy container;
receive the fourth indication based on monitoring for the fourth indication; and
cease deployment of the container or the proxy container based on receiving the fourth indication.

3. The device of claim 1, where the one or more processors are further to:
determine a type of deployment for the container based on receiving the request; and
where the one or more processors, when deploying the container, are to:

deploy the container based on determining the type of deployment for the container.

4. The device of claim 1, where the one or more processors are further to:
perform a test of the container based on deploying the container; and
where the one or more processors, when receiving the first indication, are to:
receive the first indication based on performing the test of the container.

5. The device of claim 1, where the one or more processors are further to:
provide a set of instructions to the proxy container to cause the proxy container to load balance traffic in a particular manner.

6. The device of claim 1, where the one or more processors are further to:
provide a set of instructions to the proxy container to cause the proxy container to implement a rule related to traffic received by the proxy container.

7. The device of claim 1, where the one or more processors are further to:
configure a domain name system (DNS) record to permit transparent outbound transmission control protocol (TCP) proxy; and
where the one or more processors, when deploying the container, are to:
deploy the container based on configuring the DNS record.

8. A non-transitory computer-readable medium storing instructions, the instructions comprising:
one or more instructions that, when executed by one or more processors, cause the one or more processors to:
receive, from one or devices, one or more requests to deploy one or more containers associated with one or more applications,
the one or more requests including information identifying one or, more parameters of the one or more containers;
validate the one or more requests to determine whether to deploy the one or more containers based on receiving the one or more requests;
deploy the one or more containers on one or more back-end hosts based on determining whether to deploy the one or more containers,
the one or more back-end hosts being connected to a private network;
receive one or more first indications that the one or more containers were successfully deployed on the one or more back-end hosts after deploying the one or more containers;
deploy one or more proxy containers on one or more front-end hosts based on receiving the one or more first indications,
the one or more front-end hosts having connectivity to an external network and the private network,
the one or more proxy containers being associated with a network administrator of the private network;
receive one or more second indications that the one or more proxy containers were successfully deployed on the one or more front-end hosts after deploying the one or more proxy containers; and
provide one or more third indications to the one or more devices to notify one or more other devices that the one or more containers were successfully deployed based on receiving the one or more second indications.

9. The non-transitory computer-readable medium of claim 8, where the one or more instructions, that cause the one or more processors to deploy the one or more containers, further cause the one or more processors to:
deploy multiple instances of the one or more containers on the one or more back-end hosts; and
where the one or more processors, when deploying the one or more proxy containers, are to:
deploy a single proxy container, of the one or more proxy containers, based deploying the multiple instances of the one or more containers,
the single proxy container being associated with the multiple instances of the one or more containers in a manner that permits load balancing among the multiple instances of the one of more containers.

10. The non-transitory computer-readable medium of claim 8, where the one car more instructions, when executed by the one or more processors, further cause the one or more processors to:
determine that the one or more applications are web-based applications based on the one or more parameters;
determine that the one or more containers are to be deployed on the one or more back-end hosts based on determining that the one or more applications are web-based applications; and
where the one or more instructions, that cause the one or more processors to deploy the one or more containers, cause the one or more processors to:
deploy the one or more containers based on determining that the one or more containers are to be deployed on the one or more back-end hosts.

11. The non-transitory computer-readable medium of claim 8, where the one or more instructions, when executed by the one or more processors, further cause the one or more processors to:
fail to validate one or more other requests based on receiving the one or more other requests; and
prevent deployment of one or more other containers based on failing to validate the one or more other requests.

12. The non-transitory computer-readable medium of claim 8, where the one or more instructions, when executed by the one or more processors, further cause the one or more processors to:
store information identifying the one or more containers and the one or more proxy containers to permit the one or more proxy containers to provide traffic to the one or more containers.

13. The non-transitory computer-readable medium of claim 8, where the one or more instructions, that cause the one or more processors to validate the one or more requests, cause the one or more processors to:
validate the one or more requests based on at least one of:
a port number of a port to be used by the one or more containers,
a type of the one or more applications,
a credential received in association with the one or more requests,
a user identifier that identifies a user of the one or more devices,
an application identifier that identifies the one or more applications, and
a container identifier that identifies the one or more containers.

14. The non-transitory computer-readable medium of claim 8, where the one or more parameters include:
   an amount of processing resources for the one or more containers,
   a quantity of instances of the one or more containers, or
   an amount of memory resources for the one or more containers.

15. A method, comprising:
   receiving, by a device, multiple requests to deploy multiple containers on multiple front-end hosts or multiple back-end hosts,
      the multiple requests including information identifying multiple parameters associated with the multiple containers;
   validating, by the device, the multiple requests using the information identifying the multiple parameters based on receiving the multiple requests;
   deploying, by the device, the multiple containers on the multiple back-end hosts based on validating the multiple requests,
      the multiple containers being connected to a private network;
   receiving, by the device, multiple first indications that the multiple containers were successfully deployed on the multiple back-end hosts after deploying the multiple containers;
   deploying, by the device, multiple proxy containers on the multiple front-end hosts based on receiving the multiple first indications,
      the multiple proxy containers providing the multiple containers with connectivity to an external network;
   receiving, by the device, multiple second indications that the multiple proxy containers were successfully deployed on the multiple front-end hosts after deploying the multiple proxy containers; and
   providing, by the device, multiple third indications to notify at least one device that the multiple containers were successfully deployed based on receiving the multiple second indications.

16. The method of claim 15, further comprising:
   recording multiple metrics associated with deploying the multiple containers or the multiple proxy containers based on deploying the multiple containers or the multiple proxy containers; and
   performing an action based on recording the multiple metrics,
      performing the action including:
         generating a report related to deploying the multiple containers or the multiple proxy containers, or
         generating a prediction related to resources to be used for another deployment of multiple other containers or multiple other proxy containers.

17. The method of claim 15, further comprising:
   monitoring for a fourth indication to cease deployment of one of the multiple containers or one of the multiple proxy containers based on providing the multiple third indications; and
   receiving the fourth indication when an amount of time related to deployment of the one of the multiple containers or the one of the multiple proxy containers has elapsed based on monitoring for the fourth indication.

18. The method of claim 15, further comprising:
   monitoring for a fourth indication to cease deployment of one of the multiple containers or one of the multiple proxy containers based on providing the multiple third indications; and
   receiving the fourth indication by detecting that the one of the multiple containers or the one of the multiple proxy containers has received a threshold amount of traffic based on monitoring for the fourth indication.

19. The method of claim 15, where validating the multiple requests comprises:
   validating the multiple requests using a container image identifier associated with the multiple containers based on receiving the multiple requests.

20. The method of claim 15, further comprising:
   validating an amount of resources available for deployment of the multiple containers based on receiving the multiple requests; and
   where deploying the multiple containers comprises:
      deploying the multiple containers based on validating the amount of resources available for the deployment.

* * * * *